US012753873B2

(12) United States Patent
Peretti et al.

(10) Patent No.: US 12,753,873 B2
(45) Date of Patent: Oct. 6, 2026

(54) INTEGRATED HEATING AND INSULATION SYSTEM

(71) Applicant: The Dragon Group, LLC, Rathdrum, ID (US)

(72) Inventors: Todd J Peretti, Rathdrum, ID (US); Matt Nichols, Coeur d'Alene, ID (US); Brandon Slack, Oldtown, ID (US)

( * ) Notice: Subject to any disclaimer, the term of this patent is extended or adjusted under 35 U.S.C. 154(b) by 939 days.

(21) Appl. No.: 18/086,365

(22) Filed: Dec. 21, 2022

(65) Prior Publication Data

US 2023/0213132 A1 Jul. 6, 2023

Related U.S. Application Data

(60) Provisional application No. 63/295,304, filed on Dec. 30, 2021.

(51) Int. Cl.

*F16L 53/38* (2018.01)
*F16L 59/02* (2006.01)
*F16L 59/14* (2006.01)

(52) U.S. Cl.

CPC ............ *F16L 53/38* (2018.01); *F16L 59/028* (2013.01); *F16L 59/14* (2013.01)

(58) Field of Classification Search

CPC ....... F16L 53/38; F16L 59/024; F16L 59/028; F16L 59/14
USPC ........................................................ 392/468
See application file for complete search history.

(56) References Cited

U.S. PATENT DOCUMENTS

| | | | | | |
|---|---|---|---|---|---|
| 4,038,519 | A * | 7/1977 | Foucras | F16L 53/38 | 219/505 |
| 4,287,245 | A * | 9/1981 | Kikuchi | F16L 59/024 | 428/317.5 |
| 5,506,389 | A * | 4/1996 | Hidano | C30B 25/10 | 219/390 |
| 5,714,738 | A * | 2/1998 | Hauschulz | F16L 53/35 | 219/535 |
| 2009/0107558 | A1* | 4/2009 | Quigley | F16L 53/38 | 137/15.01 |
| 2012/0060407 | A1* | 3/2012 | Lindsey | A01M 1/20 | 43/124 |
| 2012/0125913 | A1* | 5/2012 | Song | F16L 53/38 | 219/546 |
| 2016/0146393 | A1* | 5/2016 | Kim | F16L 59/14 | 219/535 |
| 2020/0080401 | A1* | 3/2020 | Sherman | E21B 43/086 | |

* cited by examiner

*Primary Examiner* — Steven W Crabb
*Assistant Examiner* — Ket D Dang
(74) *Attorney, Agent, or Firm* — Chang and Hate LLP

(57) ABSTRACT

Representative implementations of devices and techniques provide an exemplary protective insulation system that includes a heating element. The protective insulation system includes a substrate layer and may include a protective layer over the substrate layer. The protective insulation system is lightweight and can be installed with minimal manpower and equipment.

25 Claims, 10 Drawing Sheets

INTEGRATED HEATING AND INSULATION SYSTEM

PRIORITY CLAIM AND CROSS-REFERENCE TO RELATED APPLICATION

This application claims the benefit under 35 U.S.C. § 119(e)(1) of U.S. Provisional Application No. 63/295,304, filed Dec. 30, 2021, which is hereby incorporated by reference in its entirety.

BACKGROUND

Protective insulation is installed on pipes, tanks, and related connectors, valves, and components in various locations around the world, and in different types of environments. Many industries, including manufacturing, oil, food, mining, and others use insulation to protect as well as to maintain a desired thermal condition for their equipment. The protective insulation must withstand the elements for as long as possible, providing protection as well as providing for optimal performance.

SUMMARY

This Summary is provided to introduce a selection of concepts in a simplified form that are further described below in the Detailed Description. This Summary is not intended to identify key features or essential features of the claimed subject matter, nor is it intended to be used as an aid in isolation to determine the scope of any claimed subject matter.

In brief and at a high level this disclosure describes, among other things, a protective insulation comprising a thermal and protective barrier to the elements, that also includes an integrated heating system. Prior art solutions provide a separate insulation material that is often deployed over separately installed heat wire, heat tape, or the like that is wrapped around pipe, tanks, connectors, valves, and so forth. Not only is an integrated solution quicker and easier to install, but troubleshooting and repairing an integrated system is also much more time and cost effective.

In various embodiments, the protective insulation includes a substrate layer covered with a protective layer. In various alternate embodiments, the protective insulation can include multiple protective layers and/or various combinations of substrate layers and protective layers—which may also be combined with other layers. For instance, in various implementations, one or more heat-generating layers may be combined with the substrate and protective layer(s), as discussed further below.

In various examples, the substrate layer comprises a light-weight foam material (such as polyisocyanurate, for example) that has a density of between 1 to 10 pounds per cubic foot, but may have a density of less than 1 to over 60 pounds per cubic foot in some embodiments. The protective layer can comprise a polyurea material capable of being sprayed while in a liquid state and curing to a solid state. The protective layer adheres to the inner and/or outer surfaces of the substrate layer. The protective layer may be sprayed or otherwise coated onto the surface(s) of the substrate layer after the substrate layer is formed. Alternately, the protective layer may be applied to the inside surface of a mold, and the substrate layer can be deposited into the mold afterwards, such that the protective layer is adhered to the outer surface of the substrate layer once cured. One or more additional protective layers may be applied to the inside surface of the formed substrate layer.

The substrate layer may have a unitary construction or may be comprised of multiple portions or panels that are assembled together. In an alternate embodiment, the thickness of the substrate layer is non-uniform over the length and/or width of the substrate layer. For instance, the substrate layer may be thicker at a top portion or a bottom portion than at a side portion of the substrate layer (or vice versa). The panels (if applicable) may have the same or different thicknesses. In other words, the panels may be uniform or non-uniform in thickness.

In various embodiments, at least the substrate layer is injection molded, allowing the substrate layer to take on various shapes and physical dimensions as desired, for a multitude of applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure. Shapes and/or dimensions shown in the illustrations of the figures are for example, and other shapes and or dimensions may be used and remain within the scope of the disclosure, unless specified otherwise.

DETAILED DESCRIPTION

Overview

Figure 1:
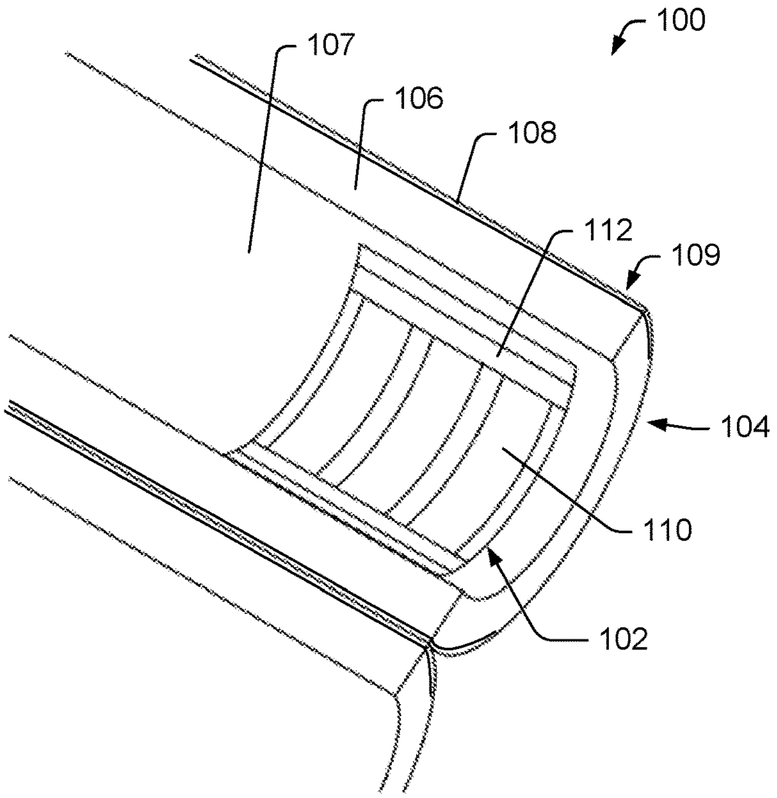
FIGS. 1 and 2 show a perspective view and an end view, respectively, of an example heating and insulation system, according to an embodiment.

Conventionally, exterior insulation applied to pipes, fittings, valves, tanks, and so forth comes in separate sheets or blankets that are secured to the desired surface, and then often covered with a protective layer or shield. The insulating sheet or blanket can be a flexible thermal material and the protective layer may be metal, composite, plastics, and so forth. In some cases, it is desirable for the pipes, fittings, valves, tanks, etc. to be maintained at a particular temperature. This may be for optimal performance of the system, to maintain a temperature range for the materials being stored or transported in the system, to protect the system from damage due to extreme temperatures, or other reasons. In these cases, it can be desirable to add a heating source to the pipes, fittings, valves, tanks, and so forth as well.

Generally, the pipes, fittings, valves, tanks, and so forth are wrapped with electrical heat tape or electrical wires configured for heating, and then the insulating material is wrapped over the heat tape or wires. Once the insulating material is secured, the protective layer is installed over the insulation. This technique of applying multiple layers has several drawbacks. For instance, if the heat tape or wires fail, the reverse process needs to be performed to remove the protective layer and then the insulating material to repair or replace the heat tape or wires. Troubleshooting the system to isolate the failed portion can also be tedious, with the reverse process often needed to identify the failed portion. Additionally, the multi-step installation process can be time consuming and labor intensive, with the accompanying costs associated with it, for the initial installation as well as for maintenance, troubleshooting, and repair. Long term costs may also be considerable, if the underlying pipes, fittings, valves, tanks, and so forth leak or otherwise fail, or if any portion of the multi-layer system fails.

Various aspects described herein may be commercialized as individual components and/or as a prepackaged kit. For example, an insulation/heating kit may include insulation sections (straights, elbows, valve covers, etc.) with pre-installed heating elements and electrical connectors integrated into the insulation sections. Various aspects described herein may also be modular. For example, insulation sections may be easily attached together and electrical connections can be connected from section to section. Various sections can also be quickly and easily installed on existing infrastructure.

This discussion of exemplary advantages is illustrative only and is not intended to be limiting. Based on the disclosure, it will be understood that additional advantages are provided by aspects described herein. Exemplary aspects hereof are described herein with reference to the figures, in which like elements are depicted with like reference numerals.

Exemplary Heating and Insulation System

Representative implementations of devices and techniques disclosed herein provide an efficient and cost effective heating and insulating solution that includes a single-step installation process. An integrated heating and insulation system 100 is disclosed that includes a protective insulation 104 having a heating element 102 integrated therein. The protective insulation 104 includes an insulative substrate 106, which can also include a protective layer 108 surrounding all or part of the substrate 106. In various embodiments, the novel system 100 is much easier and cost effective to install and maintain, and has improved weather resistance and longevity.

Referring to FIGS. 1-21, exemplary embodiments of the disclosed system 100 are constructed from a protective insulation 104 that is comprised of an insulating substrate layer 106 covered with at least one protective layer 108. The insulating substrate layer 106 is generally formed to have a shape that conforms to a desired application (such as a pipe, a tank, associated components, or the like). A heating element 102 is integrated into the substrate layer 106 and/or one or more of the protective layers 108, such that installing the protective insulation 104 on the item to be protected also installs the heating element 102 on the item. Electrical connections for the heating element 102 can also be integrated into the substrate layer 106 or a protective layer 108. While the drawings and description show and discuss a pipe/tank system as an application of an exemplary protective system 100, this is not intended to be limiting. The system 100 with any or all of the related components discussed herein may be applied to any other component or system desired to be protected and temperature controlled. In various embodiments, components of the system 100 may have varying shapes, sizes, textures, and so forth, and remain within the scope of the disclosure.

The substrate layer 106 is a lightweight thermally insulating material, such as foam, which can take any desired shape, and the protective layer 108 is a polymer, such as polyurea. The thickness and the density of the substrate layer 106 and/or the protective layer 108 can vary based on the individual components to be protected and/or temperature controlled. For instance, the thickness of the substrate layer 106 can be less than 1" to over 12" thick in some cases.

For example, a 2-inch layer of foam (such as polyisocyanurate, for example) having a density of 2-6 pounds per cubic foot may be utilized for the substrate 106 in some applications. Foams of other thicknesses and densities may also be used, including foams having a density of less than 1 to over 60 pounds per cubic foot. Closed cell foams having a density from 2 to over 10 pounds per cubic foot may also be used. The foam can be molded or formed to have a shape and size (and particularly an interior shape and size) that closely conforms to the components to be protected, for optimized thermal protection/control.

The substrate layer 106 may be a unitary construction or it may be comprised of multiple components that come together in a modular fashion. For example, a unitary or modular construction may be provided by molding foam into the shape desired for the application (such as the shape of a connection elbow or tee). The substrate layer 106 includes an inner surface 107 and an outer surface 109, which defines a thickness of the substrate layer 106. The thickness of the substrate layer 106 may be constant over a length and width of the substrate 106, or the thickness may vary. Once formed, the protective layer 108 may then be applied, such as by spraying the protective layer 108 to the outer surface 109 of the substrate layer 106. In some cases, one or more protective layers 108 may be applied to the inner surface 107 of the substrate 106.

The protective layer 108 can be made from pure polyureas or hybrid polyureas to provide excellent durability, weather resistance, and longevity. Even a thin protective layer 108 provides resistance to abrasion and adds strength to the substrate layer 106, as well as providing protection from ultra-violet radiation, oxidation, moisture, and other environmental factors. In some cases, various polymers or other synthetic or natural materials may also be used for one or more protective layers. Any one or combination of these materials may be used for the protective layer 108 or for multiple protective layers 108.

The protective layer 108 is generally adhered to the outer surface 109 of the substrate 106 but can also be adhered to the inner surface 107. For example, the aforementioned materials can be available as a spray-able (or otherwise applied) liquid and may thus be applied to the substrate layer 106 via spraying (or brushing, etc.). Other materials are also included in the scope hereof. The combination of a light-weight substrate 106 and protective layer 108 provides the advantages described herein, and other advantages will be appreciated by a person having skill in the art. In installation environments that do not need additional protection, the outer protective layer 108 may be optional or omitted.

Figure 2:
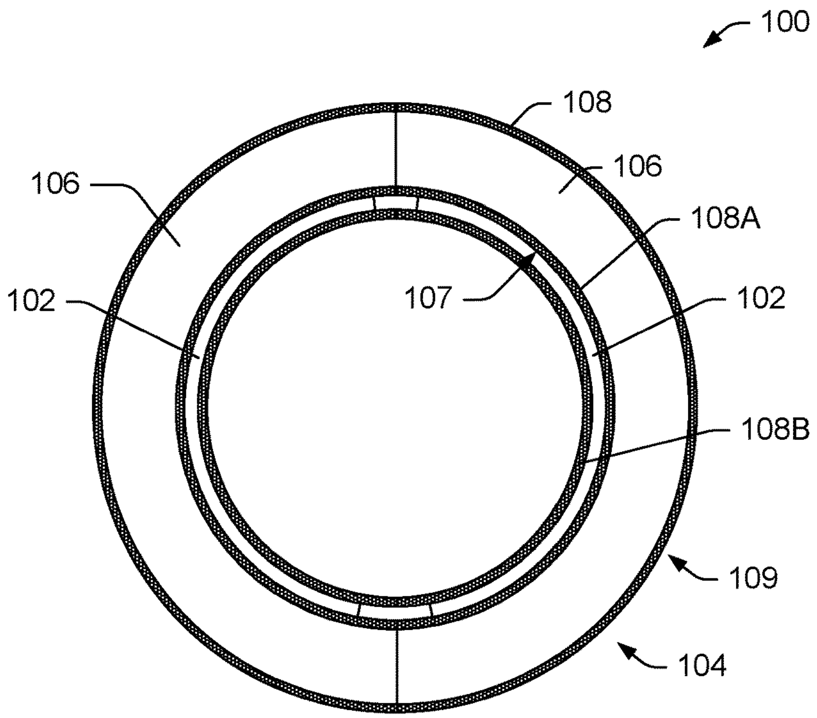

Referring to FIGS. 1 and 2, some examples of heating and insulation system 100 arrangements are shown. For instance, referring to FIG. 1, one or more heating elements 102 can be adhered to the inner surface 107 of the substrate 106, affixed to the inner surface 107 of the substrate 106, or can be molded or embedded into the substrate 106 (generally at the inner surface 107). This allows the heating element(s) 102 to be near the component to be heated. Alternately, the heating element(s) 102 can be adhered to or affixed to the outer surface 109 of the substrate 106, optionally with one or more protective layers 108 deposited over the heating element(s) 102. A heating element 102 can be adhered to a surface of the substrate 106 (or a protective layer 108) using one or a combination of various adhesives, epoxies, coatings, or the like. For example, a protective layer 108 can be used as an adhesive between the substrate 106 and the heating element 102 as well as over the heating element 102 while positioned on the substrate 106. Additionally, any of various fasteners (e.g., hardware, mechanical fasteners, adhesive components, friction components, etc.) can be used to affix the heating element 102 to the substrate 106 or to a protective layer 108. One or more protective layers 108 can be applied over the heating element 102 if desired.

Referring also to FIG. 2, in various examples, the heating element 102 can be disposed between multiple layers of the protective layer 108 if desired. For instance, a first one or more protective layers 108A can be deposited onto part or all of the inner surface 107 of the substrate 106. The heating element 102 can be adhered or affixed to the first protective layer(s) 108, and additional one or more protective layers 108B can be applied over the heating element 102, as well as part or all of the first protective layer 108A. This seals the heating element(s) 102 within a protective envelope, protecting the heating element(s) 102 from environmental conditions. If desired, one or more additional layers of protective layer 108 can be applied, or one or more layers of protective layer 108 can be omitted. In alternate implementations, the substrate 106 can be minimized or omitted. For example, the heating element 102 can be sandwiched between two protective layers 108 (of multiple layers of protective layer 108), with a thin layer of substrate 106 included in the combination or alternately without a substrate 106.

In another example, the heating element 102 is embedded into a surface (either the inner surface 107 or the outer surface 109) of the substrate 106. For example, the heating element 102 can be molded into a surface of the substrate 106 while the substrate 106 is being formed. Alternately, the heating element 102 can be molded into a surface of the substrate 106 while the substrate 106 is curing or after the substrate 106 has been formed. For example, the heating element 102 can be embedded into soft uncured substrate 106, can be disposed in a recess carved out of a cured substrate 106, can be disposed on a surface of the substrate 106, or the like. In some examples, heating elements 102 may be disposed on an inner surface 107 of the substrate 106 and an outer surface 109.

In one example, the heating element 102 can be disposed between the substrate 106 and the component to be heated, without being embedded itself into the material of the substrate 106. For instance, one or more electrical connectors, components, or other fasteners, etc. can be integral to the substrate 106 or embedded into the material of the substrate 106, with the heating element 102 permanently or removably coupled to the electrical connectors, components, or other fasteners. In this example, the heating element 102 can be integrated to the substrate 106 via the connectors, components, fasteners, etc.

Figure 3:
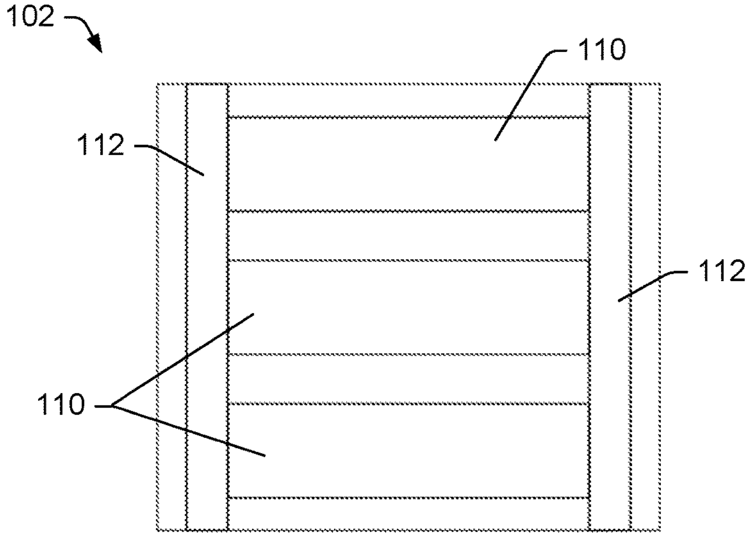
FIG. 3 shows an example heating element, according to an embodiment.
Figure 4:
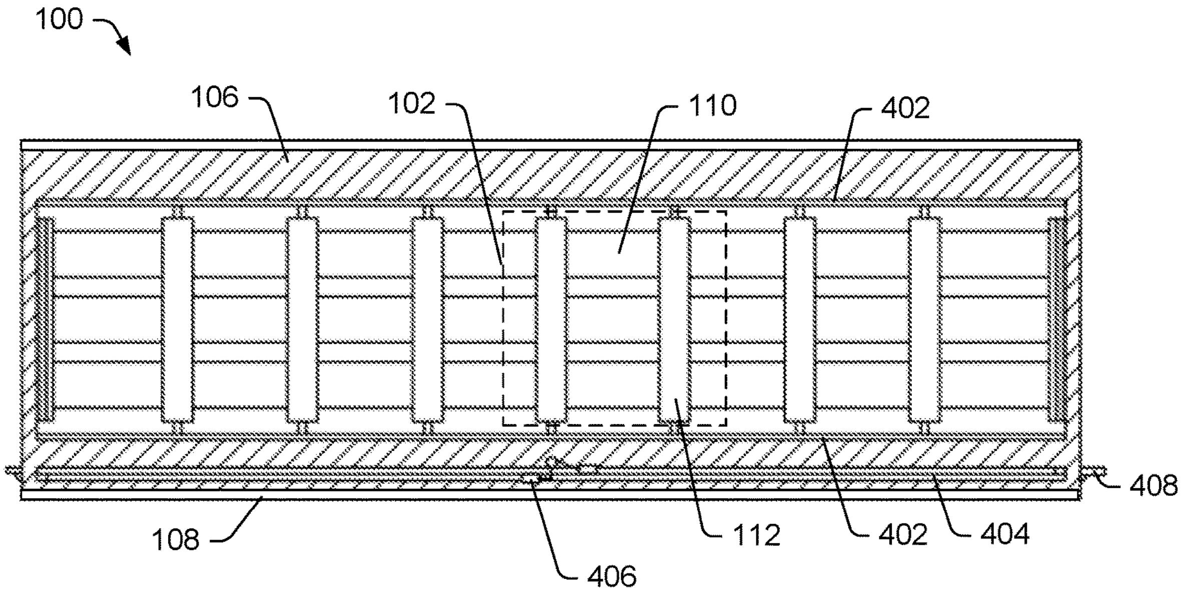
FIG. 4 shows a cut-away view of an example heating and insulation system section, including chained heating elements, according to an embodiment.

Referring to FIGS. 3-6, the heating element 102 may take many forms, as desired for the application. As shown at FIG. 3, the heating element 102 can comprise one or more sheets of conductive ink 110 (having a desired resistance/impedance) coupled to power and ground conductors 112. The conductors 112 can be flat copper strips (or other conductive materials) bonded to the conductive ink sheets 110 or embedded/integral to the substrate 106 or protective layer 108. This provides a flat profile heating element 102 that fits well within the insulative substrate 106 and will contact or sit close to the component to be heated. In the various examples, the heating element 102 comprises a resistive portion or resistive media, such as the conductive ink 110 for example, and a conductive portion or conductive media, such as the conductors 112 or other traces, busses, etc., for example.

In an example, conductive ink 110 is printed on a plastic sheet. Copper conductors 112 (or other conductive material) are disposed on each of opposing edges of the printed ink 110. A second plastic sheet is laid over the ink 110 and the conductors 112 and the plastic sheets can be fused together. The conductive strips 112 can be accessed for power either by allowing a portion of the conductive strips 112 to extend beyond the plastic sheets, or by forming an opening in a plastic sheet (two openings in the same sheet or one in each) over each conductive strip 112.

As an alternative, the conductive ink 110 can be printed onto or embedded into a surface of the substrate 106 or the protective layer 108. For instance, the conductive ink 110 can be disposed (3D printed, for example) onto either surface of the substrate 106 and/or onto either surface of the protective layer 108—or multiple layers of the substrate 106 and/or protective layer 108. The conductors 112 can be positioned on either edge of the ink 110 to make contact with the ink 110, and a poly layer (or the like) can be bonded over the top of the ink 110 and conductors 112. The poly layer may comprise the material of the protective layer 108 if desired. Alternately, the conductors 112 can be adhered to or embedded into a surface of the substrate 106 and/or a surface of a protective layer 108, so as to make contact with the ink 110 initially or when the system 100 is assembled.

Conductive ink 110 can be formed according to prior art solutions, where the composition of the ink can be altered to achieve a desired resistance value, and thus a desired wattage per foot of the heating element 102. For example, the proportions of the constituent ingredients can be adjusted to adjust the heating capabilities.

Indicators, such as LEDs can be coupled in parallel with the sheets of ink 110 to show correct installation and indicate operation. Plugs, connectors, or other connection devices may be bonded to the conductive strips 112 to couple them to power and ground, or to couple them to another heating element 102. For instance, as shown in the cut-away section of FIG. 4, multiple heating elements 102 can be coupled together in series or in parallel to heat a larger surface area. Bus conductors 402 can run the length of a heating and insulation system 100 section, tying the power and ground conductors 112 together within the section. The bus conductors 402 can have access to the exterior of the substrate 106 for making connection to a power source. Additional conductors 404 for power, grounding, signaling, and so forth, can also run the length of the system 100 section, or can run part-way through a section and be coupled using conductive couplers 406, or the like. In some cases, the conductive couplers 406 can have access to the outside of the system 100 section, for powering the section or a group of sections, or for access to data and signaling components. Additionally, each end of the system 100 section may include a section coupler 408 for electrically coupling multiple sections together. The section coupler 408 can be embedded into the substrate 106 and be electrically coupled (or electrically continuous) to the bus conductors 402, the additional conductors 404, and/or the conductive couplers 406, such that signals and/or power can be propagated through multiple sections of the system 100.

Figure 5:
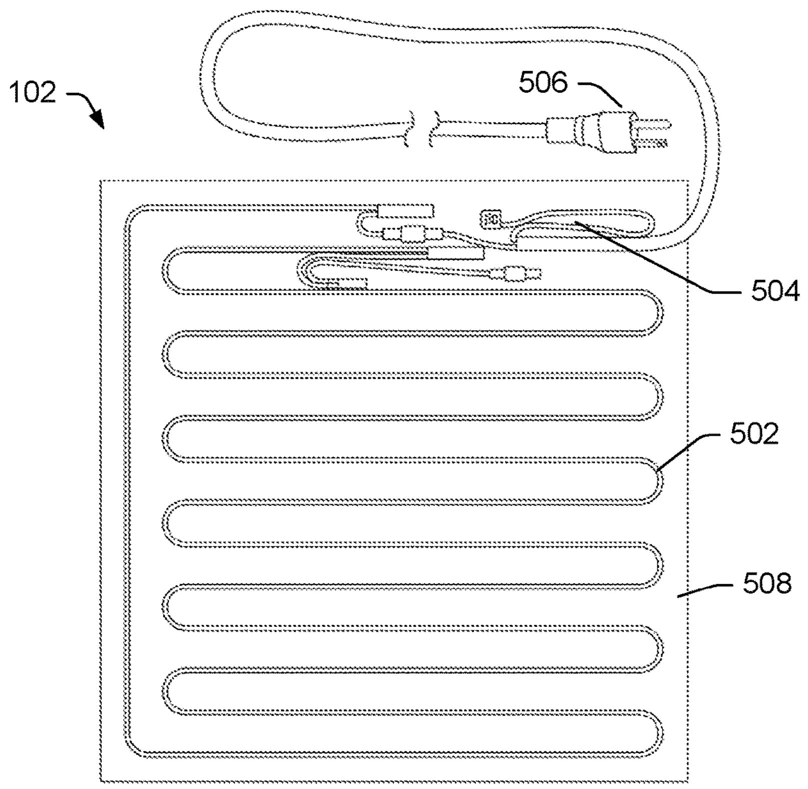
FIG. 5 is an illustration of an example heating element, according to another embodiment.
Figure 6:
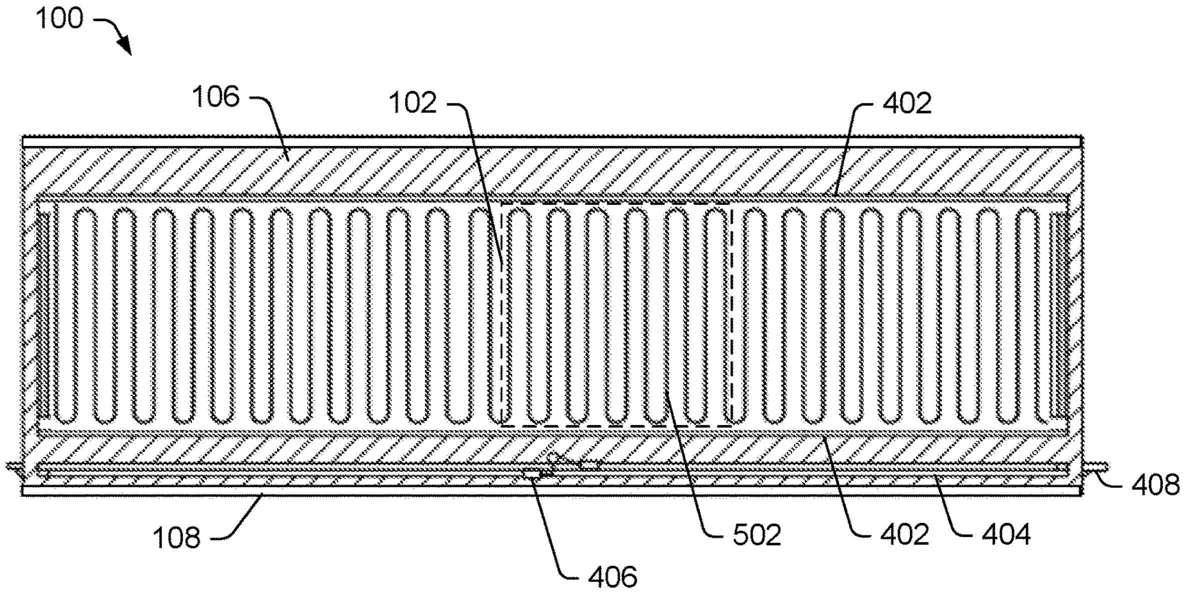
FIG. 6 shows a cut-away view of an example heating and insulation system section, including integrated heating element(s), according to an embodiment.

As shown at FIG. 5, a heating element 102 can have other forms, including an arrangement of resistive conductors 502, and the like, coupled to power and ground conductors 504. The resistive conductors 502 can be insulated or uninsulated conducting (e.g., metal and/or other conductive materials) wires or elements with a predetermined resistance and a given cross-section or profile (e.g., rounded, stranded, flat, etc.), and can be arranged for heat distribution as desired. In the example of FIGS. 5 and 6, the resistive conductors 502 comprise the resistive portion of the heating element 102, which are coupled in a circuit to the power and ground conductors 504 (e.g., the conductive portion of the heating element 102). In some cases, the resistance of the resistive conductors 502 can be adjusted (e.g., with additional resistive components in series or parallel with the resistive conductors 502) as desired for a desired thermal output. The power and ground conductors 504 are coupled to a power source, such as an electrical outlet or supply. In some cases, the power and ground conductors 504 are coupled to the power source via an electrical plug 506.

In various examples, the resistive conductors 502 are coupled to a flexible or semi-flexible backing 508 for ease of handling. The backing 508 can then be disposed on the inner surface 107 or the outer surface 109 of the substrate 106 (with or without a protective layer 108 between the substrate 106 and the heating element 102. This provides a flat profile heating element 102 that fits well within the insulative substrate 106 and will contact or sit close to the component to be heated. The resistive conductors 502 can be coupled to the backing 508 using an adhesive, a quantity of fasteners, or other means. In one case, the resistive conductors 502 may be stitched to the backing 508, or similar. With the heating element 102 disposed at the substrate 106 (with or without the backing 508), the heating element 102 can be coated with one or more protective layers 108 if desired.

As an alternative, the resistive conductors 502 can be disposed at the inner surface 107 or the outer surface 109 of the substrate 106 directly. For instance, one or more protective layers 108 may be applied to the substrate 106. The resistive conductors 502 can be laid in the protective layer 108. One or more protective layers 108 may be applied over the resistive conductors 502, the backing 508 if present, and part or all of the surface of the substrate 106 to seal the resistive conductors 502 to the substrate 106. Power and ground conductors 504 can be routed through an opening in the substrate 106 or through a seam between substrate 106 sections.

Figure 7:
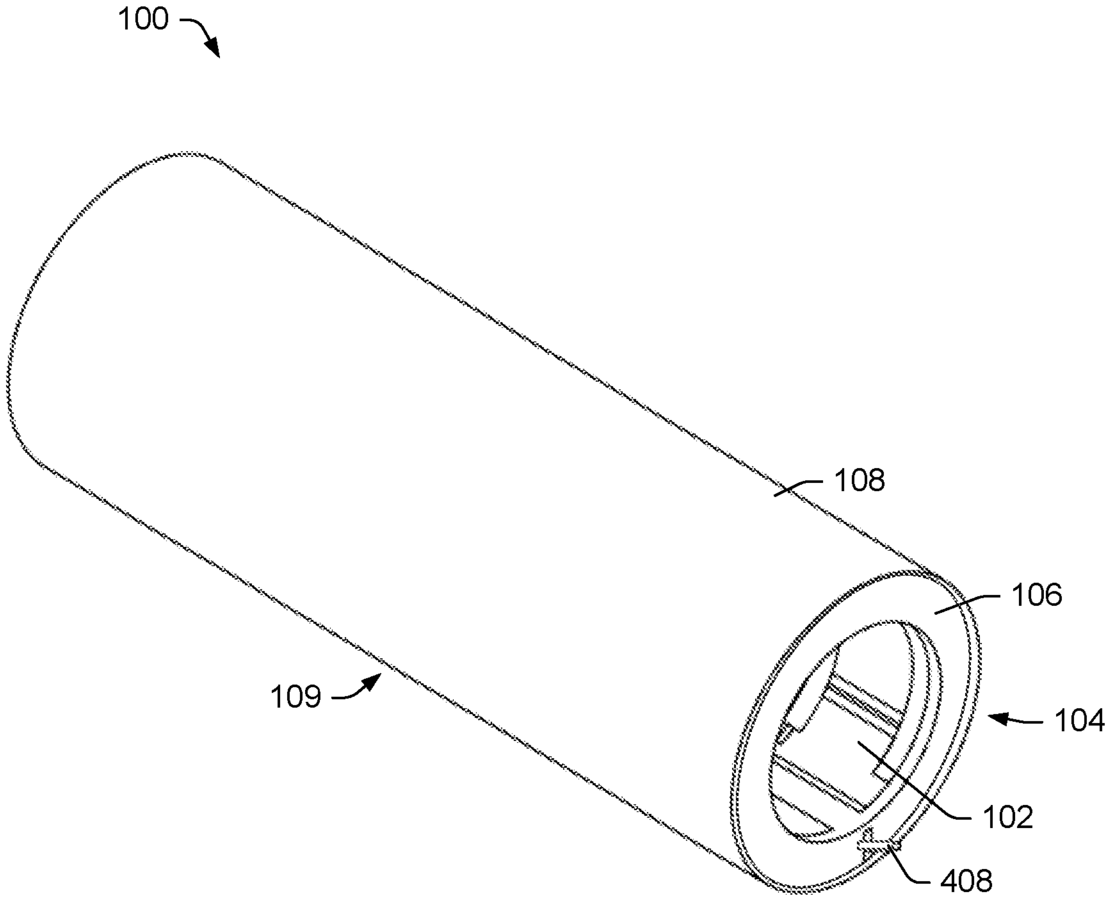
FIG. 7 shows an example heating and insulation system section configured for a straight pipe application, according to an embodiment.

Indicators, such as LEDs can be coupled in parallel with the resistive conductors 502 to show correct installation and indicate operation. Cables, connectors, or other connection devices may be bonded to the backing 508 and can be used to couple the heating element 102 to another heating element 102. For instance, as shown in the cut-away section of FIG. 6, multiple heating elements 102 can be coupled together in series or in parallel to heat a larger surface area. Bus conductors 402 can run the length of a heating and insulation system 100 section, tying the power and ground conductors 504 together within the section. Additional conductors 404 for power, grounding, signaling, and so forth, can also run the length of the system 100 section, or can run part-way through a section and be coupled using conductive couplers 406, or the like. In some cases, the conductive couplers 406 can have access to the outside of the system 100 section, for powering the section or a group of sections. For instance, each end of the system 100 section may include a section coupler 408 for coupling multiple sections together. FIG. 7 shows a perspective view of an example heating and insulation system 100 straight section. An example integrated heating element 102 is shown within the protective insulation 104, where it can contact the item (e.g., a straight section of pipe) to be heated and insulated.

Figure 8:
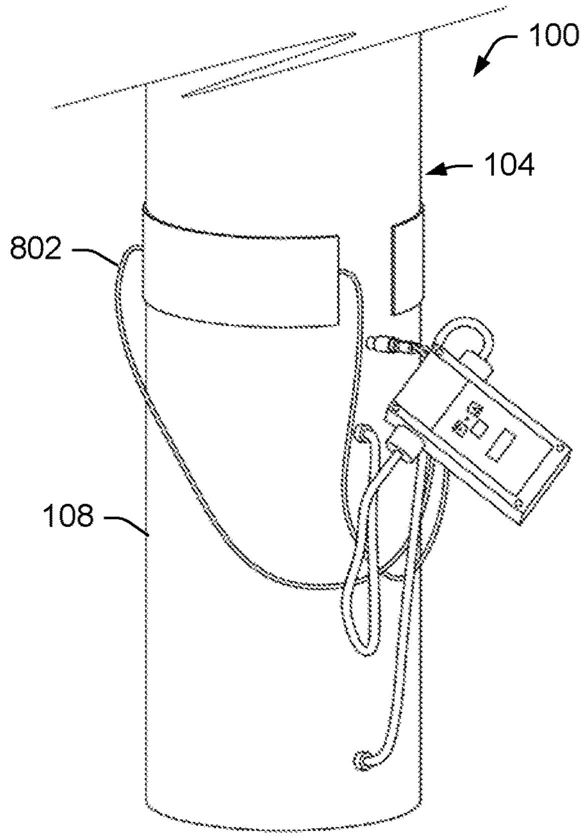
FIGS. 8 and 9 show example installations of heating and insulation systems on a pipe component, according to an embodiment.
Figure 9:
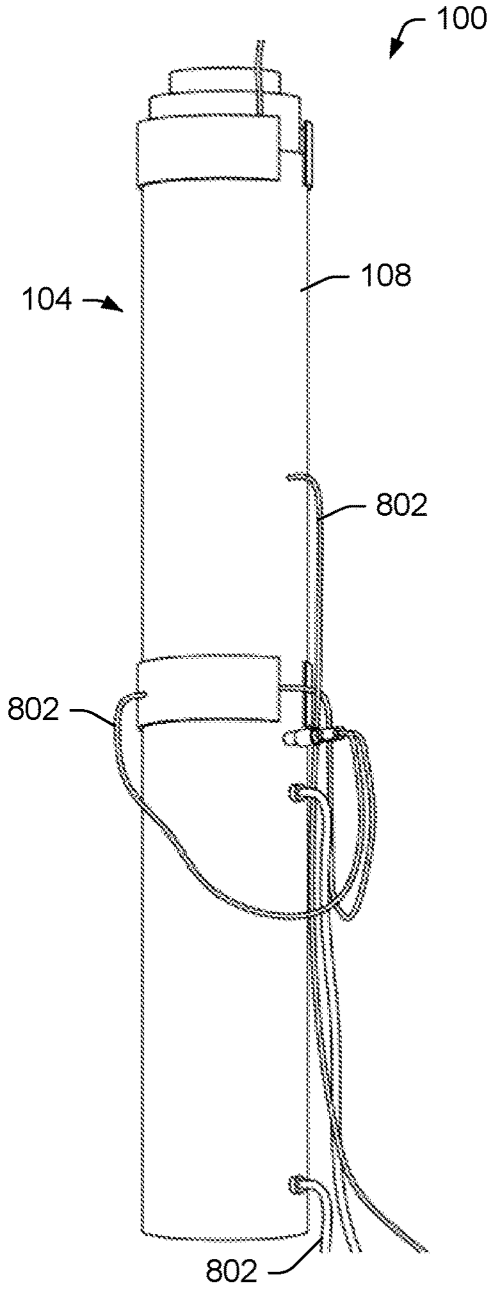
Figure 10:
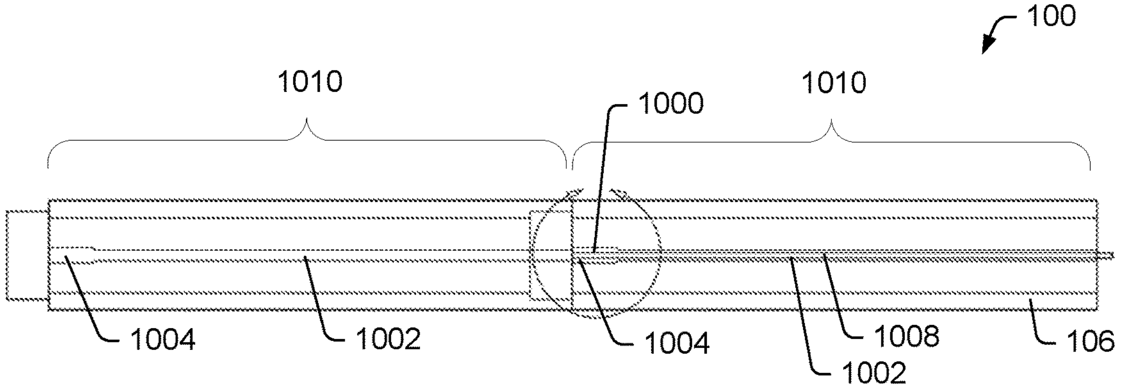
FIGS. 10-12 show side, detail, and end views of an example heating and insulation system, including integrated electrical connectors, according to an embodiment.
Figure 11:
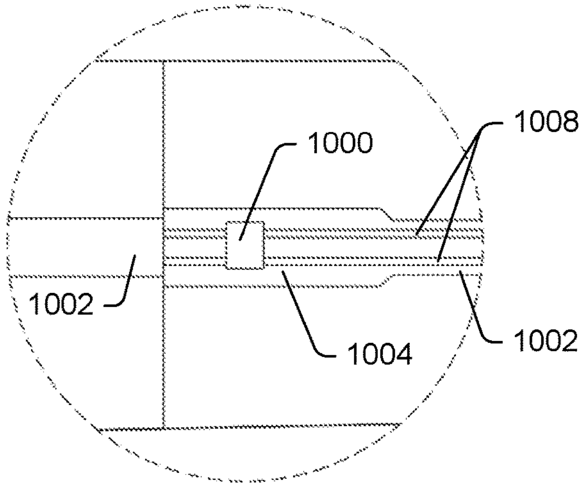
Figure 12:
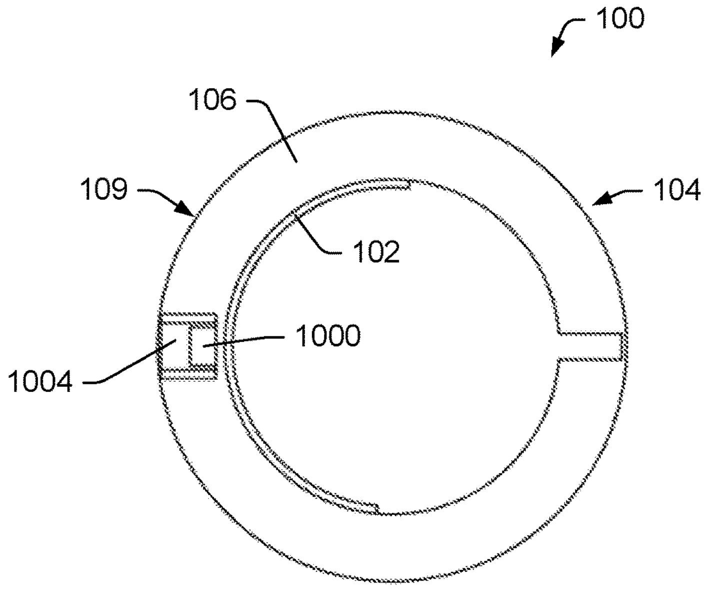

FIGS. 8 and 9 show two perspective views of an example application of the heating and insulation system 100. The system 100 can be applied in multiple segments, and with a custom fit for the component(s) to be insulated and heated. Connections 802 protrude from the outer protective layer 108 or substrate 106, which are coupled to the heating element(s) 102 to energize the heating element(s) 102. Connections 802 can include power cables and/or plugs, data cables and/or plugs, and the like. The connections 802 can be easy assembly plugs (such as plug 506, or other simple-to-use plugs, for instance), so that the installation can be done without an electrician. The power requirement for the heating and insulation system 100 may be nominal at 110 to 220 volts, or other voltages can also be used if needed. At this voltage, 8 to 10 AWG conductors may be used to feed the system 100. Other sized conductors may be used if needed for the current draw.

Various connectors can be used to couple power cables, data cables, and the like, between sections 1010 of a system 100 and from the system 100 (i.e., components of the system 100, such as a heating element 102) to a power source, a data receiving component, and so forth. Referring to FIGS. 10-15, some connectors 1000 can be positioned into grooves 1002 or pockets 1004 along the outer surface 109 of the substrate 106 or the protective layer 108 (not shown). For example, the connectors 1000 may be embedded in the insulative substrate 106 or the protective layer 108, and receive some degree of insulation and/or protection. Connectors 1000 positioned at the ends of substrate sections 1010 can be coupled together when placing the sections 1010 end-to-end. For example, a male connector 1000 at the end of one section 1010 can be coupled to a female connector 1000 at the end of the next section 1010. Connectors 1000 may be water-proof in construction and design as well as rated for outdoor use in harsh environments. Wires 1008 coupling the connectors 1000 to the heating elements 102 can also be run in grooves 1002 or pockets 1004, or they can be embedded within the substrate 106 or the protective layer 108 (as shown at FIGS. 17-18 and 20-21). In various examples, the combination of the protective insulation 104, the heating element(s) 102, and the wires, connectors, components, etc. (e.g., the system 100) can all be coated in one or more protective layers 108.

Figure 13:
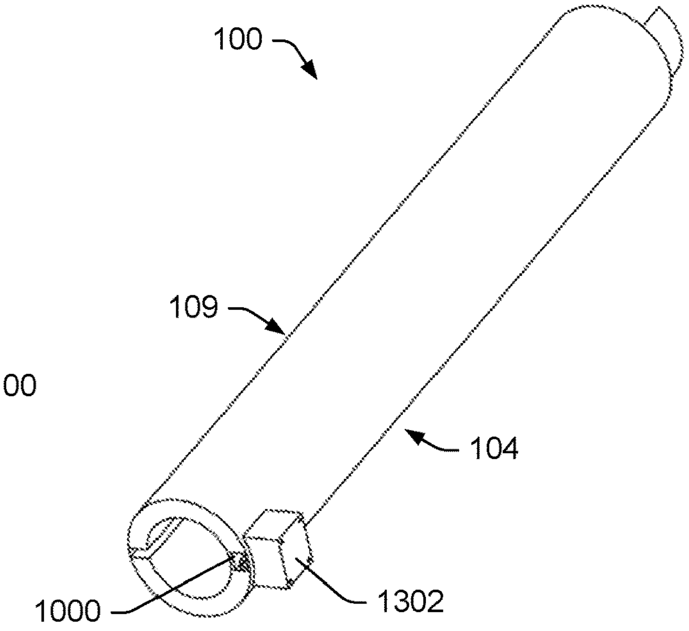
FIGS. 13-14 show a perspective view and a side view of an example heating and insulation system, including a control box, according to an embodiment.
Figure 14:
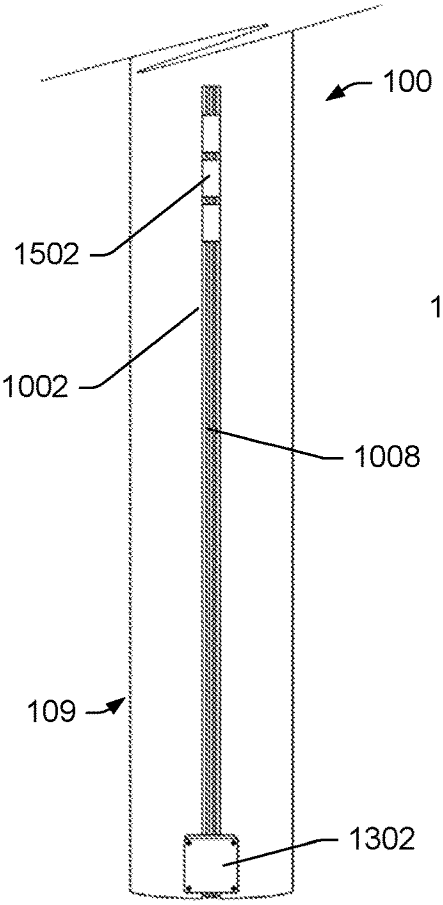
Figure 15:
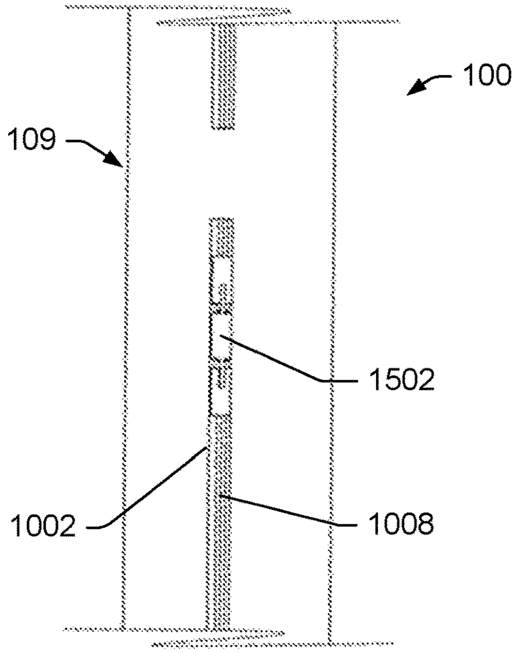
FIG. 15 shows a side view of an example electrical connection of a heating and insulation system, including electrical connectors, according to an embodiment.

Referring to FIGS. 13-15, in various implementations, connectors 1000 can also include bus bars 1502 as well as other coupling components. For example, a bus bar 1502 can be positioned within a groove 1002 or pocket 1004, or can be embedded into the protective layer 108 or the substrate 106. The bus bar 1502 can include holes configured to connect the conductors 1008 from two sections 1010 placed end-to-end. The bus bars 1502 can be coupled using screws, bolts, rivets, and other hardware. Control enclosures 1302 can also be integrated onto or into the outer surface 109 of a section 1010 (substrate 106 or protective layer 108). Control enclosures 1302 may be used to house temperature controls or indicators, and may include sensors, probes, or other instrumentation. The control enclosures 1302 can be coupled to the connectors 1000 and/or the conductors 1008 (including power and/or data conductors, for example) for powering and/or data distribution/transmission at the enclosed components and instrumentation.

Figure 16:
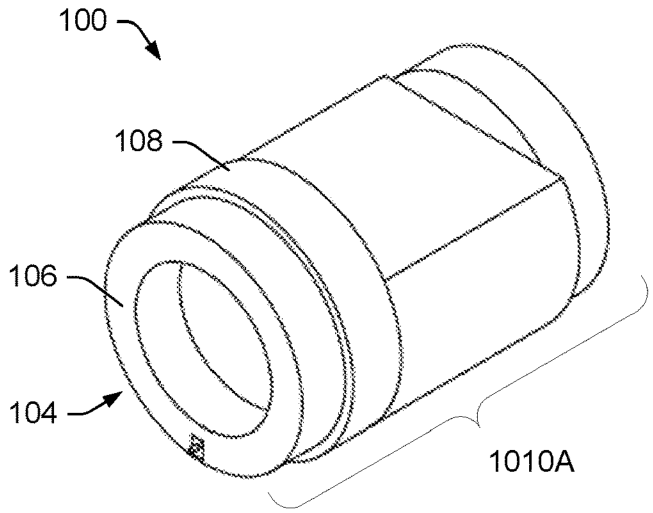
FIG. 16 shows a perspective view of a molded section of an example heating and insulation system, according to an embodiment.
Figure 17:
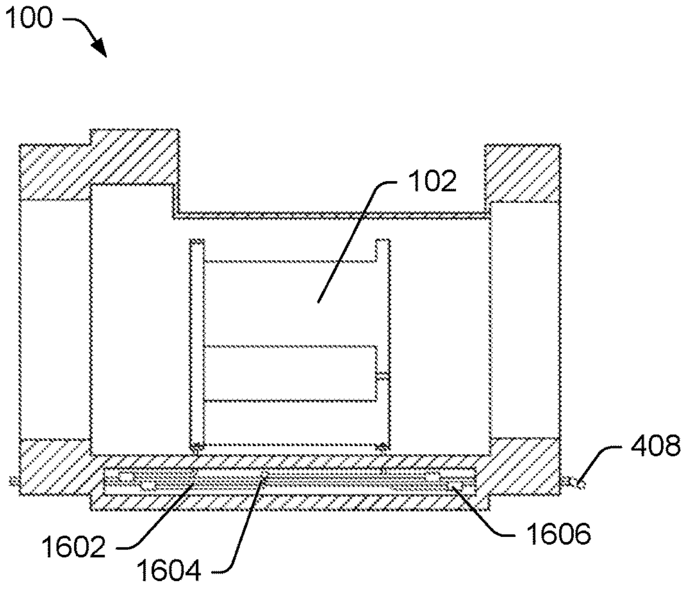
FIGS. 17 and 18 show right and left cutaway side views of the molded section of FIG. 16, according to an embodiment.
Figure 18:
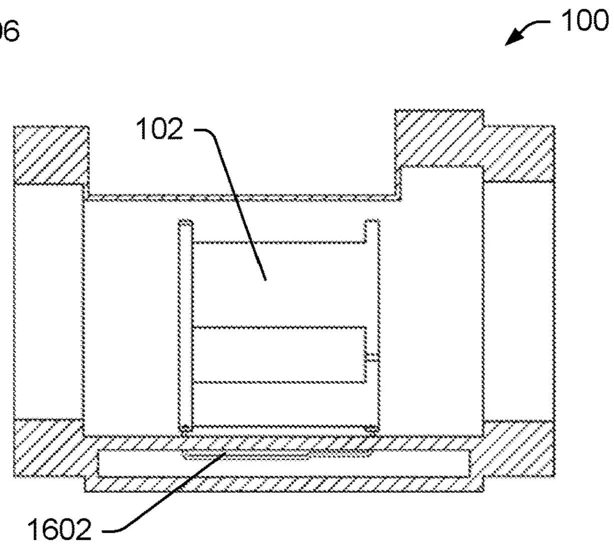
Figure 19:
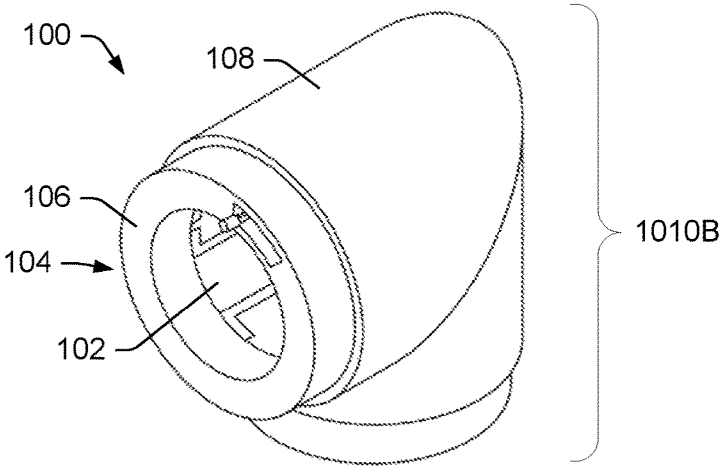
FIG. 19 shows a perspective view of a molded section of an example heating and insulation system, according to an embodiment.
Figure 20:
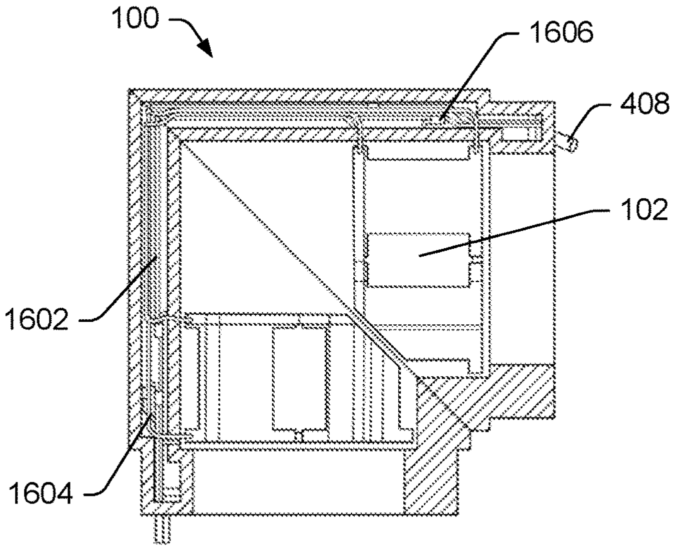
FIGS. 20 and 21 show right and left cutaway side views of the molded section of FIG. 19, according to an embodiment.
Figure 21:
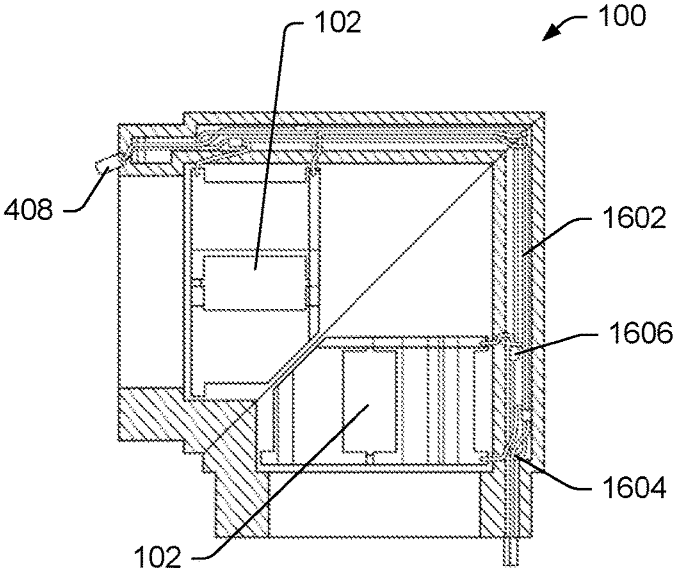

In various embodiments, sections 1010 can be molded to have shapes, sizes, and configurations for various predetermined applications. In other words, the sections 1010 (e.g., the substrate layer 106) can be molded to have a shape, size, and configuration to closely conform to the shape, size and configuration of the components to be enclosed or encased in the protective insulation 104. In particular, the inner surface 107 of a section 1010 can closely conform to the exterior surface of the component to be encased and protected. For instance, the example molded section 1010A at FIG. 16 can be applied to cover a valve and the example molded section 1010B at FIG. 19 can be applied to cover a 90 degree elbow. The two examples shown at FIGS. 16 and 19 are molded to be applied to two predetermined applications, and are but two examples of a multitude of possible example molded sections 1010, each with potentially unique shapes, sizes, and configurations. In other words, molded sections 1010 can be fully customized to meet unique specifications. Unique customization also includes customized support infrastructure embedded within each section 1010, to support the heating element(s) 102 and for control, data, power, and so forth. As shown at FIGS. 16-21, molded sections 1010 can include wires 1602 (or other conductors, data lines, control lines, fiber optics, shielding, ground planes, etc.) and cable management components 1604 (e.g., bands, clamps, couplers, looms, etc.) embedded within or between layers of the substrate 106 and/or the protective layer 108, as well as couplers 1606 and connectors. In some cases, communication components (e.g., transmitters and/or receivers, modems, repeaters, amplifiers, global positioning satellite (GPS) components, etc.), sensors, instrumentation, and the like may also be included within sections 1010. Embedding the aforementioned components can provide protection from the elements and provide easy access within and from the outer surface 109 (using connectors 1608, for example). As mentioned above, couplers 408 at the ends of the sections 1010 can be joined by joining the sections 1010 end-to-end in a modular fashion.

Representative Process

Figure 22:
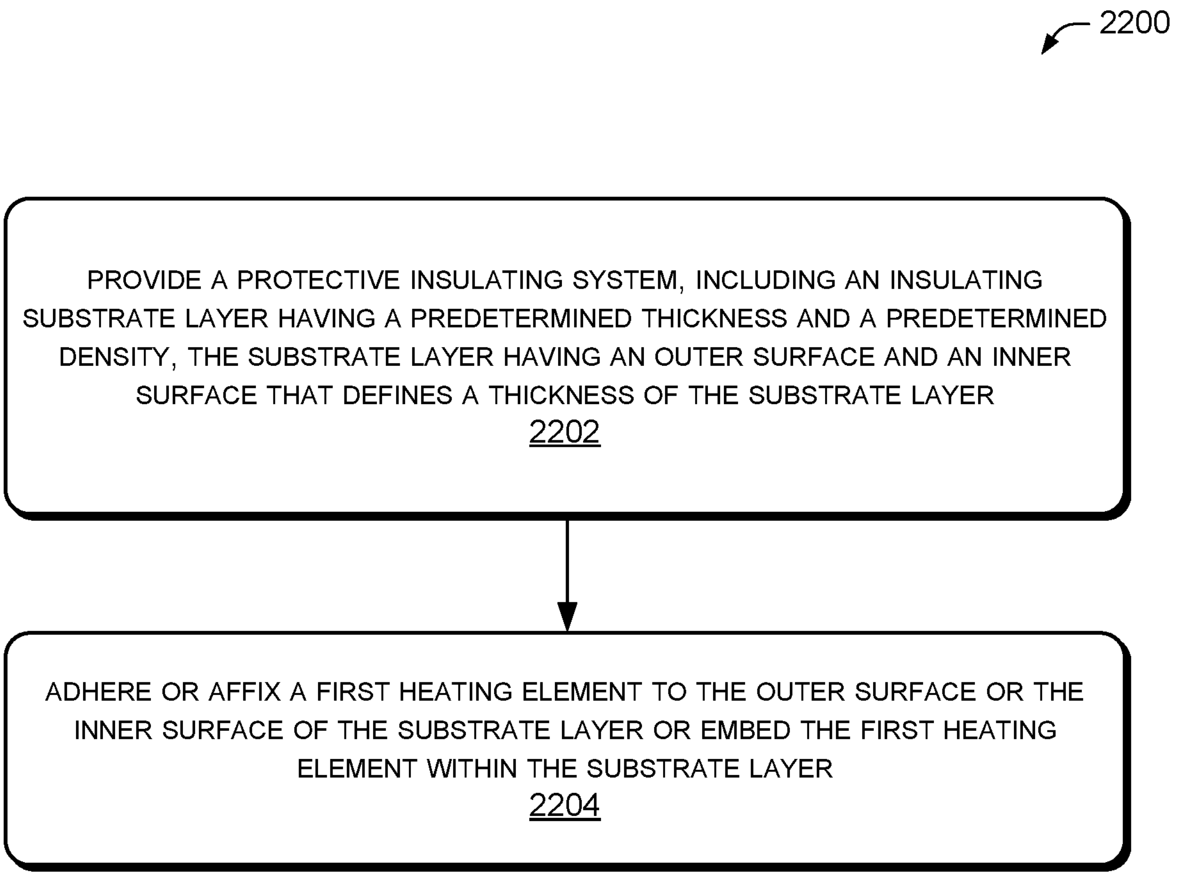
FIG. 22 is a flow diagram illustrating an example process of forming a heating and insulation system, according to an implementation

FIG. 22 illustrates a representative process 2200 for implementing techniques and/or devices relative to providing a protective heating and insulation system (such as the system 100, for example), according to various embodiments. The system includes protective insulation (such as protective insulation 104, for example) formed from at least one or two layers and includes at least one heating element (such as heating element 102, for example). The example process 2200 is described with reference to FIGS. 1-21.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable hardware, software, firmware, or a combination thereof, without departing from the scope of the subject matter described herein.

At block 2202, the process includes providing a protective insulating system, including an insulating substrate layer (such as the substrate layer 106, for example) having a predetermined thickness and a predetermined density, the substrate layer having an outer surface and an inner surface that defines a thickness of the substrate layer.

At block 2204, the process includes adhering or affixing a first heating element (such as heating element 102, for example) to the outer surface or the inner surface of the substrate layer or embedding the first heating element within the substrate layer. The first heating element can be adhered, affixed, or embedded to the substrate layer prior to installation of the substrate around a component to be protected/heated. In an embodiment, the process includes applying a first protective polymer layer (such as protective layer 108, for example) over the substrate and the first heating element. In another embodiment, the process includes applying a second protective polymer layer between the substrate and the first heating element. For instance, the second protective layer may be applied to all or part of the substrate prior to adhering or affixing the first heating element to the inner surface or outer surface of the substrate.

In an embodiment, the process includes molding the substrate layer such that the inner surface conforms to a component to be encased within the substrate layer. For instance, the substrate layer could be molded so that the inner surface closely conforms to the shape and size of a straight pipe, an elbow pipe, a valve, a tank, and so forth. In an example, the heating element is integrated to the substrate layer during manufacturing of the substrate layer. This allows the heating element to be installed to the component to be encased within the substrate layer as the substrate layer is installed to the component (a one-step installation process). Thus, the integration of the heating element (and its associated infrastructure) to the substrate layer reduces the technical skills needed at installation, including the need for an electrician.

In an embodiment, the process includes disposing one or more electrical conductors within the substrate or within a groove or a pocket in the substrate, and coupling the one or more electrical conductors to the first heating element.

In various embodiments, a number of substrates can be joined together in a modular fashion to cover a long pipe or one that has angles and bends, and may also have valves and so forth. Molded sections of substrate can be modularly joined both physically and electrically, such that each part of the pipe (or other components to be protected) are covered by substrate and so that heating elements within each of the substrate sections are powered by an electrically continuous path. In the embodiments, the process includes coupling the one or more electrical conductors of the first substrate to one or more electrical conductors of a second substrate and a second heating element integrated with the second substrate, via a first coupler embedded at the first substrate and a second coupler embedded at the second substrate. The couplers can have physical connecting features as well as electrical connecting features for one or more electrical connections. The one or more electrical connections may include power, grounding, data, signaling, communications, and so forth.

Aspects of the present disclosure have been described with the intent to be illustrative rather than restrictive. Alternative aspects will become apparent to those skilled in the art that do not depart from its scope. A skilled artisan may develop alternative means of implementing the aforementioned improvements without departing from the scope of the present disclosure.

It will be understood that certain features and sub-combinations are of utility and may be employed without reference to other features and sub-combinations and are contemplated within the scope of the claims. Not all steps listed in the various figures need be carried out in the specific order described.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the claims.

What is claimed is:

1. A protective insulating system comprising:

a modular insulation section, including:

a first semi-cylindrical insulating substrate layer portion having a predetermined thickness and a predetermined density, the first semi-cylindrical insulating substrate layer portion having an outer surface and an inner surface that defines the predetermined thickness of the first semi-cylindrical insulating substrate layer portion;

a second semi-cylindrical insulating substrate layer portion having the predetermined thickness and the predetermined density, the second semi-cylindrical insulating substrate layer portion having an outer surface and an inner surface that defines the predetermined thickness of the second semi-cylindrical insulating substrate layer portion;

and a first heating element comprising one or more resistive conductors coupled to a flexible backing, the flexible backing adhered or affixed to the outer surface or the inner surface of at least one of the first and second semi-cylindrical insulating substrate layer portions or embedded within the at least one of the first and second semi-cylindrical insulating substrate layer portions, wherein the outer surface and the inner surface of each of the first semi-cylindrical insulating substrate layer portion and the second semi-cylindrical insulating substrate layer portion, and the first heating element are coated with one or more protective layers of a polyurea moisture barrier capable of being applied while in a liquid state and curing to a solid state.

2. The protective insulating system of claim 1, further comprising one or more additional heating elements electrically coupled in series or in parallel with the first heating element.

3. The protective insulating system of claim 1, further comprising a second protective moisture barrier layer surrounding the first and second semi-cylindrical insulating substrate layer portions.

4. The protective insulating system of claim 3, wherein the second protective moisture barrier layer adheres to the outer surface of the first and second semi-cylindrical insulating substrate layer portions.

5. The protective insulating system of claim 3, wherein the second protective moisture barrier layer adheres to the outer surface and the inner surface of the first and second semi-cylindrical insulating substrate layer portions.

6. The protective insulating system of claim 3, wherein the second protective moisture barrier layer comprises a polyurea material capable of being sprayed while in a liquid state and curing to a solid state.

7. The protective insulating system of claim 1, further comprising a protective polymer layer applied as adhesive that coats at least part of the inner surface of at least one of the first and second semi-cylindrical insulating substrate layer portions, between the inner surface of the at least one of the first and second semi-cylindrical insulating substrate layer portions and the first heating element.

8. The protective insulating system of claim 7, wherein the first heating element is adhered to or affixed to the protective polymer layer applied as adhesive.

9. The protective insulating system of claim 8, wherein the first heating element is coated with a second protective polymer moisture barrier layer.

10. The protective insulating system of claim 1, wherein the first heating element is coated with multiple protective polymer moisture barrier layers.

11. The protective insulating system of claim 1, further comprising one or more electrical connectors embedded into at least one of the first and second semi-cylindrical insulating substrate layer portions.

12. The protective insulating system of claim 1, further comprising one or more electrical connectors disposed within a groove or a pocket in at least one of the first and second semi-cylindrical insulating substrate layer portions.

13. The protective insulating system of claim 1, further comprising one or more electrical conductors embedded into at least one of the first and second semi-cylindrical insulating substrate layer portions.

14. The protective insulating system of claim 1, further comprising one or more electrical conductors disposed within a groove or a pocket in at least one of the first and second semi-cylindrical insulating substrate layer portions.

15. The protective insulating system of claim 1, wherein at least one of the first and second semi-cylindrical insulating substrate layer portions comprises a light-weight foam material having a density of between 1 to 10 pounds per cubic foot.

16. A protective insulating system comprising:

an insulating foam substrate layer having a predetermined thickness and a predetermined density, the substrate layer having an outer surface and an inner surface that defines a thickness of the substrate layer;

a first heating element comprising one or more resistive conductors coupled to a flexible backing integrated with the outer surface or the inner surface of the substrate layer; and a protective polymer moisture barrier layer comprising a polyurea material capable of being applied while in a liquid state and curing to a solid state that coats the outer surface and the inner surface of the substrate layer and the first heating element.

17. The protective insulating system of claim 16, further comprising one or more electrical conductors disposed within the substrate layer and configured to have access to an exterior of the substrate layer.

18. The protective insulating system of claim 16, further comprising one or more electrical connectors disposed within the substrate layer or within a groove or a pocket in the substrate layer.

19. The protective insulating system of claim 16, wherein the first heating element is adhered to or affixed to the substrate layer.

20. The protective insulating system of claim 16, wherein the first heating element is embedded into the substrate layer.

21. A method, comprising:

providing a protective insulating system, including first and second insulating substrate layer portions, each having a predetermined thickness and a predetermined density, the first and second insulating substrate layer portions having an outer surface and an inner surface that defines a thickness of the first and second insulating substrate layer portions;

adhering or affixing a first heating element comprising one or more resistive conductors coupled to a flexible backing to the outer surface or the inner surface of at least one of the first and second insulating substrate layer portions or embedding the first heating element within at least one of the first and second insulating substrate layer portions; and applying a first protective polymer moisture barrier layer over the outer surface and the inner surface of each of the first and second insulating substrate layer portions and the first heating element, the first protective polymer moisture barrier layer comprising a polyurea material capable of being applied while in a liquid state and curing to a solid state.

22. The method of claim 21, further comprising molding the first and second insulating substrate layer portions such that the inner surface conforms to a component to be encased within the first and second insulating substrate layer portions.

23. The method of claim 21, further comprising applying a second protective polymer moisture barrier layer between the at least one of the first and second insulating substrate layer portions and the first heating element.

24. The method of claim 21, further comprising disposing one or more electrical conductors within at least one of the first and second insulating substrate layer portions or within a groove or a pocket in at least one of the first and second insulating substrate layer portions, and coupling the one or more electrical conductors to the first heating element.

25. The method of claim 24, further comprising providing one or more additional insulating substrate layer portions and coupling the one or more electrical conductors to one or more additional electrical conductors of the one or more additional insulating substrate layer portions and a second heating element integrated with the one or more additional insulating substrate layer portions, via a first coupler embedded at the first or second insulating substrate layer portion and a second coupler embedded at the one or more additional insulating substrate layer portions.

* * * * *